United States Patent
Kunken et al.

(10) Patent No.: US 10,781,844 B2
(45) Date of Patent: Sep. 22, 2020

(54) SUBSTRATE ANCHORING DEVICE

(71) Applicant: Lee Kunken, Sebastopol, CA (US)

(72) Inventors: Lee Kunken, Sebastopol, CA (US); Jan R. Lau, Windsor, CA (US); Jonathan Morris, Santa Rosa, CA (US)

(73) Assignee: Lee Kunken, Sebastopol, CA (US)

( * ) Notice: Subject to any disclaimer, the term of this patent is extended or adjusted under 35 U.S.C. 154(b) by 0 days.

(21) Appl. No.: 15/997,460

(22) Filed: Jun. 4, 2018

(65) Prior Publication Data

US 2018/0283434 A1 Oct. 4, 2018

Related U.S. Application Data

(63) Continuation-in-part of application No. 14/929,417, filed on Nov. 2, 2015, now Pat. No. 9,989,080.

(51) Int. Cl.
| | |
|---|---|
| *F16B 13/08* | (2006.01) |
| *F16B 5/02* | (2006.01) |
| *F16B 13/00* | (2006.01) |

(52) U.S. Cl.
CPC ............ *F16B 13/0808* (2013.01); *F16B 5/02* (2013.01); *F16B 13/002* (2013.01)

(58) Field of Classification Search
CPC .......................... F16B 13/0808; F16B 13/0833
USPC .......................... 411/347, 340–343, 544, 999
See application file for complete search history.

(56) References Cited

U.S. PATENT DOCUMENTS

| | | | | |
|---|---|---|---|---|
| 613,933 | A | * | 11/1898 | McCreery ........... F16B 13/0808 411/346 |
| 1,353,159 | A | * | 9/1920 | Hammermann .... F16B 13/0808 411/340 |
| 1,803,431 | A | * | 5/1931 | Hill ....................... B60R 13/105 411/349 |
| 2,408,560 | A | | 10/1946 | Keehn |
| 2,587,058 | A | * | 2/1952 | Melrose .................. F16B 21/10 411/344 |
| 2,601,802 | A | * | 7/1952 | Hanson .................... B60D 1/02 411/343 |
| 2,769,363 | A | * | 11/1956 | Kight ....................... F16B 2/18 411/343 |
| 3,168,850 | A | | 2/1965 | Tennican |
| 3,487,744 | A | * | 1/1970 | Montana ............. F16B 13/0808 411/346 |

(Continued)

*Primary Examiner* — Flemming Saether
(74) *Attorney, Agent, or Firm* — Knobbe, Martens, Olson & Bear LLP

(57) ABSTRACT

A fastener for attaching together layers of a substrate. The fastener includes a slide body, a bolt, a conical spring, and a toggle having a pivot coupled with one end of the slide body. The conical spring is disposed over a shaft of the bolt and the shaft is engaged within the slide body. The slide body and toggle are inserted into an aperture through the layers of substrate in a first configuration until the conical spring contacts a front face of the layers of substrate. Compression of the conical spring against the front face advances the toggle a clearance length out of the aperture on a back face of the layers of a substrate such that the toggle can switch to a second configuration that prevents retraction through the aperture. Extension of the conical spring automatically engages the toggle with the back face of the substrate to prevent rotation of the slide body within the aperture.

12 Claims, 12 Drawing Sheets

(56) References Cited

U.S. PATENT DOCUMENTS

| | | | |
|---|---|---|---|
| 3,534,650 A | | 10/1970 | Kubokawa |
| 3,933,390 A | | 1/1976 | Barrett et al. |
| 4,315,708 A | | 2/1982 | Liebig |
| 4,675,972 A | | 6/1987 | Bappert et al. |
| 5,059,075 A | * | 10/1991 | Kelly .................... F16B 41/002<br>411/107 |
| 5,209,018 A | * | 5/1993 | Heinrich ............. E05B 65/0841<br>411/347 |
| 5,544,992 A | * | 8/1996 | Ciobanu ............... F16B 5/0208<br>411/107 |
| 5,702,218 A | * | 12/1997 | Onofrio .................. E04B 9/006<br>411/341 |
| 6,709,212 B1 | | 3/2004 | Lauchner |
| 8,132,435 B2 | | 3/2012 | Thomas et al. |
| 8,237,039 B2 | | 8/2012 | Crelin |
| 9,115,744 B1 | | 8/2015 | Bulow |
| 9,567,741 B2 | * | 2/2017 | Espinosa ............... E04B 1/4164 |
| 2008/0003077 A1 | | 1/2008 | Anderson |

\* cited by examiner

SUBSTRATE ANCHORING DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference herein in its entirety and made a part of the present disclosure.

BACKGROUND

Field

The disclosure generally relates to devices for attaching a plurality of substrates and more particularly to devices for attaching a plurality of substrates where only one side of a first substrate is accessible.

Related Art

The disclosed embodiments were conceived in relation to the construction arts and in particular in relation to the addition of wooden decks to houses. Decks are extremely popular on new homes and are becoming extremely popular as add-ons to older homes. The National Association of Home Builders estimates that wood decks are included in nearly one-third of new homes, and are the most popular do-it-yourself construction project. A vast number of decks built in the last 30 years are in need of re-building, and many of these need to be redesigned with improved technology to make them safer. Deck collapses are not uncommon, and most deck collapses can be attributed to failure of the anchoring system anchoring the deck to the associated structure.

A common method for attaching a deck to an associated structure is nailing a deck beam to the rim joists of the structure. This method, however, is prone to failure over time. While nails generally have sufficient tensile strength to resist the vertical shearing force created by the weight of the deck and its contents, nails do not provide great strength laterally and are prone to pullout. Wood screws and lag screws can be used in place of nails to provide additional lateral strength, however screws are also prone to failure, particularly when there is localized rot or other decay proximate to the screw, or aging of the substrate causes enlargement of the hole around the screw.

A superior method for attaching a deck to an associated structure utilizes a bolt and nut assembly. Generally this method involves placing a bolt fitted with a washer into a hole which has been pre-drilled through both the deck beam and the rim-joist. The bolt is then fitted with a second washer and nut on the back side of the rim joist. The nut and second washer provide substantial resistance against pull-out forces even when there is localized rot common to older decks. Nevertheless, despite the superiority of the bolt and nut assembly, lack of access to the backside of the rim joist in many applications makes the use of the bolt and nut assembly impractical or even impossible.

Many attempts have been made to provide a device for joining two or more substrates which device provides high pull-out resistance and which can be deployed when the substrates can be accessed only from one side. For example, in U.S. Pat. No. 3,017,800, Cohen teaches an anchor bolt with an expanding sleeve particularly suited for joining two asbestos panels. The anchor bolt taught by Cohen however, requires a bolt-sleeve made from a compressible, flexible material which makes it ill-suited for heavy-duty applications such as joining a deck to a home.

In U.S. Pat. No. 8,439,613, Prentice teaches a fastener apparatus that features projecting locking members that extend and retract when a central drive shaft is rotated. To use this fastener, however, an internal shaft must be rotated to extend locking members before the fastener apparatus may be tightened.

In U.S. Pat. No. 3,241,420, Passer La Roy teaches a hollow wall fastening receptacle which can be used in combination with a screw to secure an object to a wall. This fastening receptacle requires that a hole be drilled through the wall for deployment of the device before the object can be attached to the fastening receptacle via a screw.

Thus, there is a need for a durable device for easily attaching a plurality of substrates together when only one side of the substrates is accessible. It is therefore, an object of one or more of the embodiments disclosed herein to provide a fastening device for joining substrates which may be deployed when only one side of the substrates is accessible.

A further object of one or more of the embodiments disclosed herein is to provide a fastening device which can be secured using a single tool.

A further object of one or more of the embodiments disclosed herein is to provide a fastening device which can be deployed through a substrate without pre-drilling a hole through the substrates.

SUMMARY

It is an object of one or more of the embodiments disclosed herein to provide a fastening device for joining a plurality of substrates which provides for high pull-out resistance, and simplicity of use. In one configuration, an internally threaded shoulder bolt is used in combination with one or more (e.g., a plurality of) deployable stop bars. The deployable stop bars are hingedly attached to a slide collar which is slidably mounted on a slide bolt. The slide bolt is threaded to work in conjunction with the internal threads of the shoulder bolt. In some configurations, a spring is provided to bias the stop bars to positions which are substantially perpendicular to the slide bolt. When the fastening device is in its undeployed state, a retaining ring is mounted on the slide collar to hold the stop bars in positions where each stop bar is substantially parallel to the slide bolt.

To secure the fastening device, the fastening device is driven through the substrates to be joined. The fastening device may be driven through pre-drilled holes in the substrates. In one embodiment the fastening device has a rigid and pointed tip and may be pushed or hammered through the substrates. In another embodiment the fastening device has a drill tip and may be driven though the substrates by rotation of the fastening device. As the fastening device is driven through the substrates, the retaining ring is pressed against the first substrate and is urged off of the slide collar, allowing the spring to bias the stop bars towards a position perpendicular to the slide bolt. When the slide collar and stop bars emerge on the opposite side of the substrates, the stop bars are deployed. Once the stop bars are deployed, the shoulder bolt is rotated causing the slide bolt to move inwardly into the hollow sleeve of the shoulder bolt and compressing the substrates between the stop bars and a flange on the shoulder bolt. The shoulder bolt is rotated until a desired torque is reached.

In one embodiment, a fastener for attaching together layers of a substrate, includes a slide body configured to be received within an aperture through the substrate. The slide body has a first end and a second end. The first end has a tapped opening. A bolt engages with the slide body. The bolt has a head and a threaded shaft. The threaded shaft is engageable within the tapped opening of the slide body. A toggle prevents removal of the fastener from the aperture. The toggle has a pivot coupled with the second end of the slide body. The toggle has a first configuration in which the toggle can advance with within the aperture and a second configuration which prevents the fastener from being retracted from the aperture. A conical spring has a narrow end and a wide end. The conical spring is disposed over the threaded shaft of the bolt with the narrow end of the conical spring adjacent to the head of the bolt and the wide end of the conical spring adjacent to the first end of the slide body. The slide body is inserted within the aperture from a front face of the substrate with the toggle in the first configuration and advanced within the aperture until the wide end of the conical spring engages with the front face of the substrate. Compression of the conical spring further advances the slide body within the aperture and advances the toggle a clearance length out of the aperture on a back face of the substrate such that the toggle can switch to the second configuration. Extension of the conical spring retracts the slide body within the aperture and engages the toggle with the back face of the substrate to prevent retraction of the slide body through the aperture. The bolt is tightened to compress the conical spring and to engage with the front face through the conical spring.

In another embodiment, the slide body is cylindrical and has an outer diameter between 0.125" and 1.0" and the toggle in the first configuration has an outer diameter that is smaller than or equal to a diameter of the aperture of the substrate and a diameter that is larger than the diameter of the aperture in the second configuration.

In another embodiment, the toggle has a single stop bar, the single stop bar pivotably engaged with the second end of the slide body by a pivot.

In another embodiment, the toggle is eccentrically mounted with respect to the pivot such that the force of gravity can rotate the single stop bar about the pivot into the second configuration.

In another embodiment, the toggle has a pair of stop bars that rotate about a pivot and a torsional spring biases the toggle into the second configuration.

In another embodiment, the conical spring is compressible into a flattened state.

In another embodiment, the fastener includes a washer. The washer is disposed between the wide end of the conical spring and the slide body. The washer provides a bearing surface for the conical spring to act against the front face of the substrate.

In another embodiment, a compressive length of the conical spring is the same as or greater than the clearance length of the toggle from the aperture.

In another embodiment, a length of the fastener from the first end of the slide body to the pivot of the toggle is equal to the sum of a width of each of the layers of the substrate, plus the clearance length of the toggle, minus a fraction of the width of one of the plurality of substrates, the fraction between selected from between ⅛ and ⅞.

One embodiment of a fastener for attaching together layers of a substrate through an aperture includes a slide body having a first end and a second end, the first end having a tapped opening. A bolt has a head and a threaded shaft. A toggle has a pivot coupled with the second end of the slide body; the toggle has a first configuration in which the toggle has a first diameter and a second configuration in which the toggle has a second diameter. A conical spring is disposed on the shaft between the slide body and the head. The toggle in the first configuration and the slide body are inserted within the aperture from a front face of the substrate and compression of the conical spring against the front face advances the toggle a clearance length out of the aperture on a back face of the substrate such that the toggle can switch to the second configuration. Extension of the conical spring automatically engages the toggle with the back face of the substrate and the bolt is tightened to compress the conical spring between the head and the front face.

In another embodiment, the toggle has a single stop bar, the single stop bar pivotably engaged with the second end of the slide body by a pivot.

In another embodiment, the toggle is eccentrically mounted with respect to the pivot such that the force of gravity can rotate the single stop bar about the pivot into the second configuration.

In another embodiment, the toggle comprises a pair of stop bars that rotate about a pivot and a torsional spring biases the toggle into the second configuration.

In another embodiment, the conical spring is compressible into a flattened state.

In another embodiment, the fastener includes a washer disposed between a wide end of the conical spring and the slide body. The washer provides a bearing surface for the conical spring to act against the front face of the substrate.

In another embodiment, a compressive length of the conical spring is the same as or greater than the clearance length of the toggle from the aperture.

Embodiments of the disclosure possess many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the embodiments; but it is to be understood that this detailed description is not to be taken in a limiting sense, since the scope of the invention is best defined by the appended claims.

BRIEF DESCRIPTION

In the accompanying drawings in which is shown several of the various possible embodiments of the subject anchoring device.

DETAILED DESCRIPTION

Figure 2:
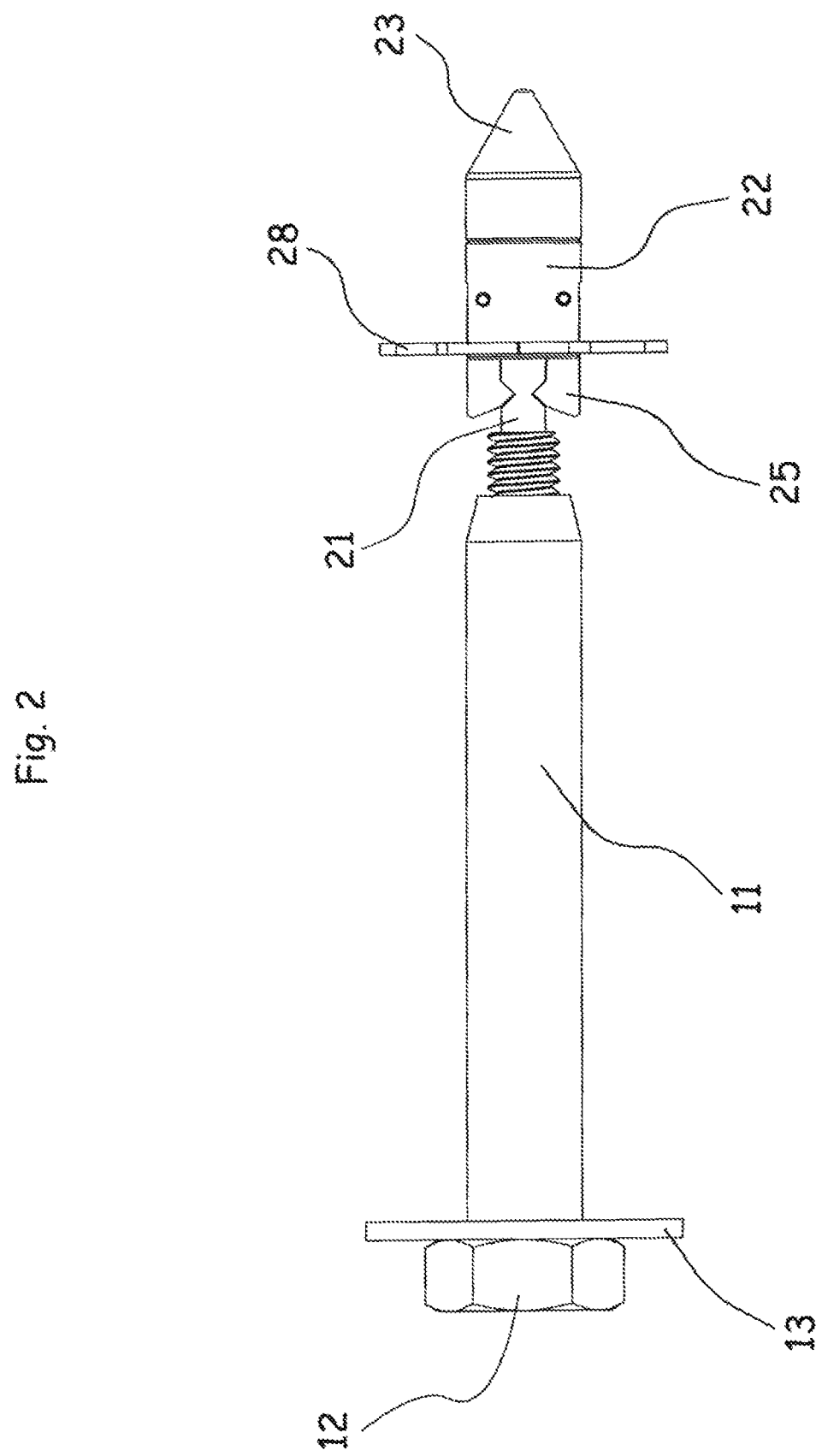
FIG. 2 is a perspective of the fastening device in its undeployed state.
Figure 3:
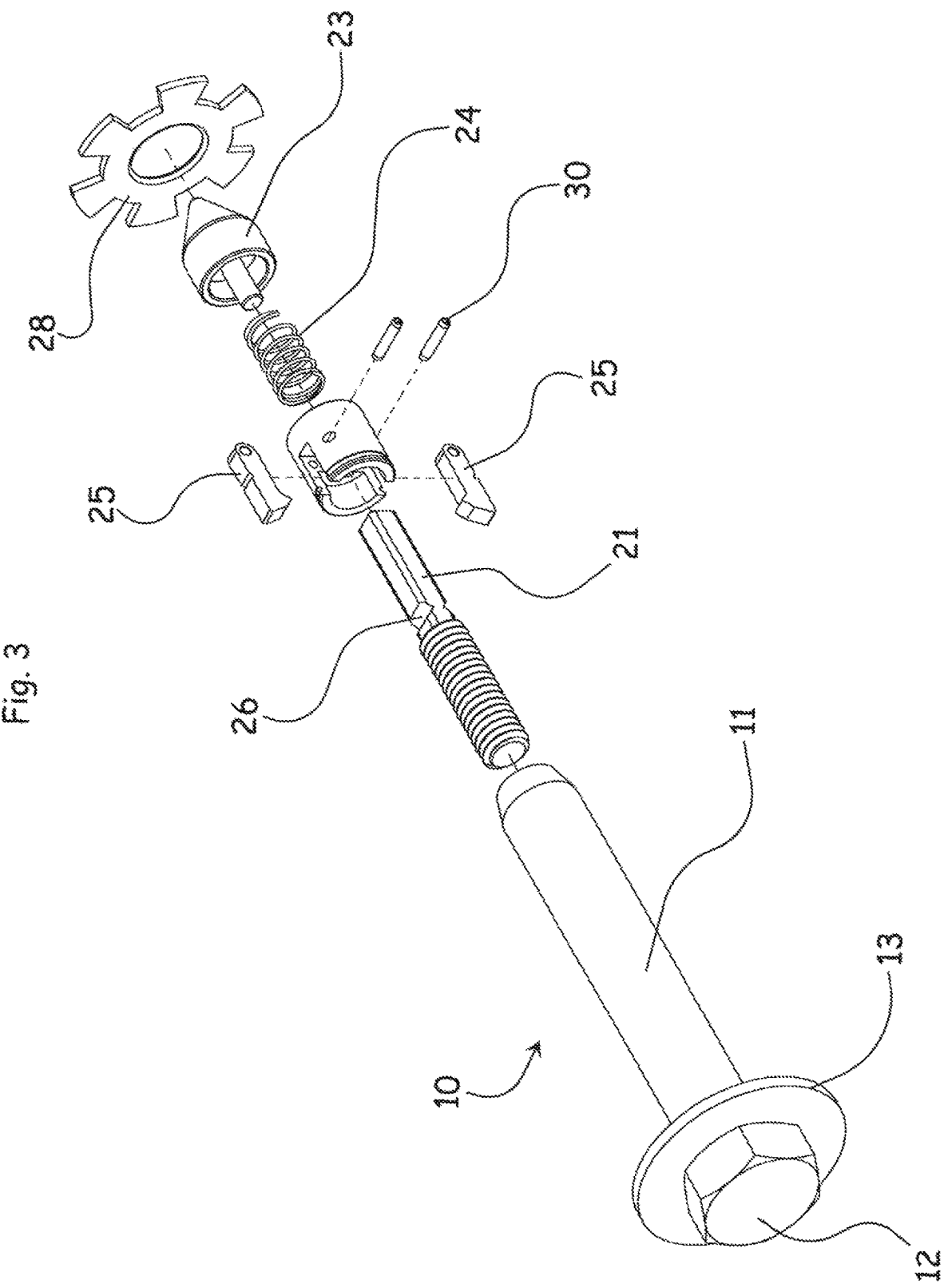
FIG. 3 is an exploded view of the fastening device.

Referring initially to FIGS. 2 and 3, a fastening device in accordance with the present invention is shown. The fastening device includes generally a shoulder bolt 10 and an anchor 20. The shoulder bolt has an internally threaded shaft 11 and a head 12, the diameter of the head being larger than the diameter of the shaft.

The anchor 20 comprises a slide bolt 21 which is threaded on a first end to work in conjunction with the internally threaded shaft 11. A second end of the slide bolt defines a plurality of slide bolt notches 26. A slide collar 22 is slidably disposed on a second end of the slide bolt 21 and a cap 23 is fixedly attached to the second end of the slide bolt 21. A biasing element, such as a spring 24, is disposed on the second end of the slide bolt between the cap 23 and the slide collar 22.

The anchor 20 further comprises a plurality of stop bars 25, hingedly attached to the slide collar 22. In a preferred embodiment, hinge pins 30 are utilized to hingedly attach the stop bars to the slide collar. The stop bars 25 are shaped to define substantially V-shaped projections 27 which are sized to fit within the slide bolt notches 26 defined in the second end of the slide bolt 21. When the stop bars 25 are disposed so that the projections 27 are within the slide bolt notches 26, the slide collar and the stop bars define a cylinder with an outer diameter substantially the same as the outer diameter of the internally threaded shaft 11.

The slide collar 22 defines a retaining ring groove 29 and each of the stop bars also define stop bar grooves 30 such that when the stop bars 25 are disposed so that the projections 27 are within the slide bolt notches 26 the grooves defined by the stop bars are aligned with the retaining ring groove 29 defined by slide collar 22. When the fastening device is in its undeployed state, a retaining ring 28 is fitted within the retaining ring groove 29 and the stop bar grooves 30 to retain the projections 27 within the slide bolt notches 26 as shown in FIG. 2.

Figure 5:
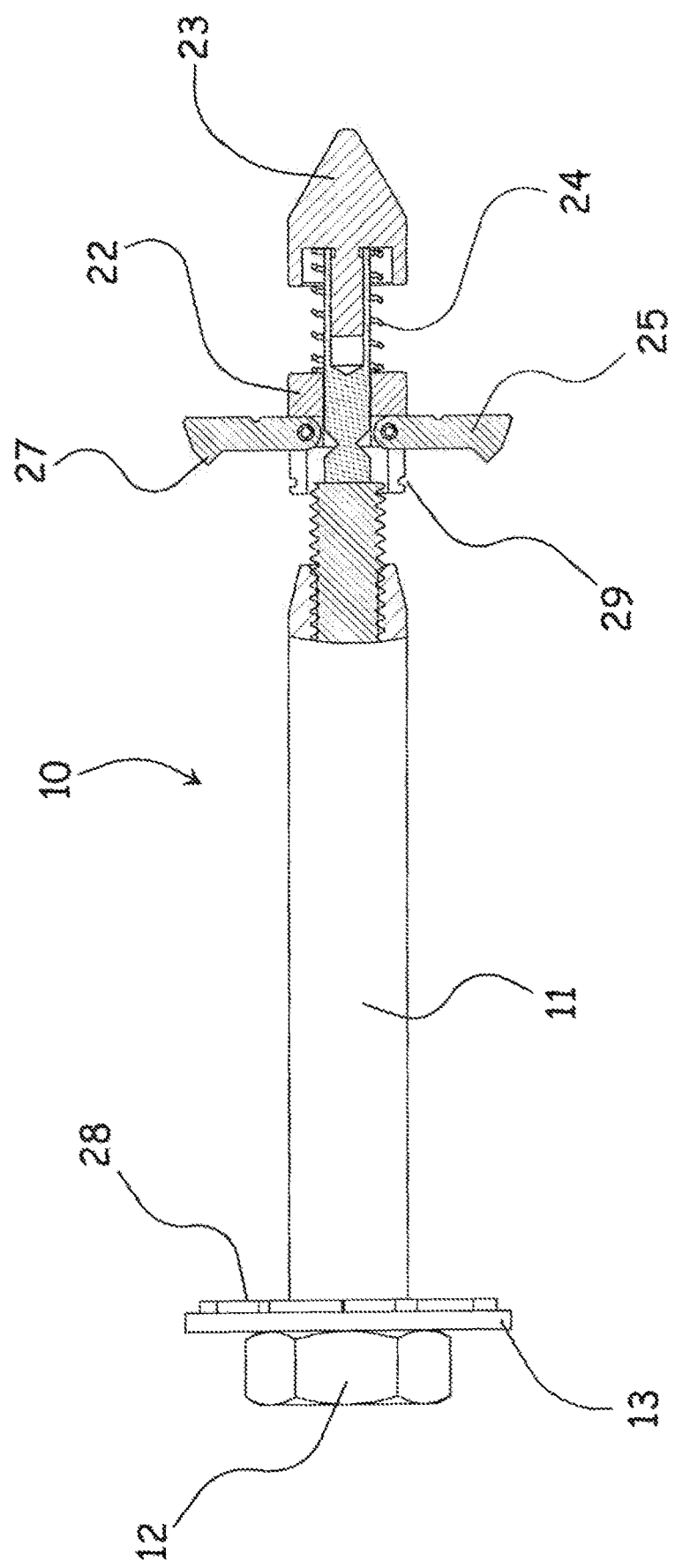
FIG. 5 is a cross section of the anchor portion of the fastening device engaged in the shoulder bolt portion.
Figure 6:
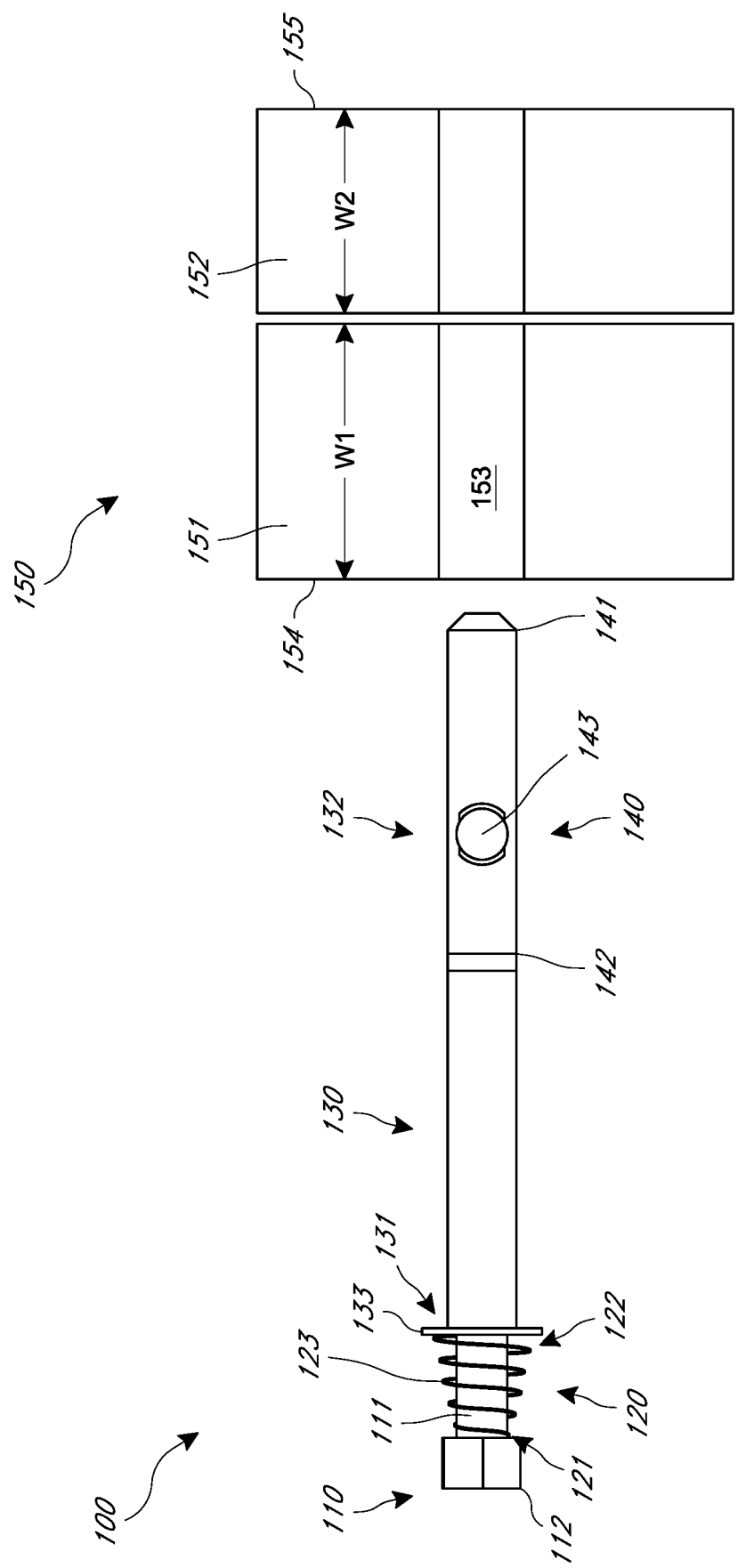
FIG. 6 shows another embodiment of a fastener.

To secure the fastening device, the fastening device is first driven through the substrates to be joined. The fastening device may be driven through pre-drilled holes in the substrates. In one embodiment the cap 23 is rigid and pointed so that the fastening device may be pushed or hammered through the substrates. In another embodiment the cap is a drill and the fastening device may be driven through the substrates by rotation of the fastening device. As the fastening device is driven through the substrates, the retaining ring 28 is pressed against the first substrate 40 and is urged out of the retaining ring groove 29 and off of the slide collar 22. When the retaining ring 28 is removed from the slide collar 22 the stop bars 25 are permitted to rotate in relation to the slide collar 22 and the projections may disengage from the slide bolt notches 26. With the projections 27 disengaged from the slide bolt notches 26, the spring 24 biases the slide collar 22 to slide directionally towards the shoulder bolt 10. As the slide collar 22 slides directionally towards the shoulder bolt 10 the stop bars 25 are biased towards a position perpendicular to the slide bolt 21. When the slide collar 22 and stop bars 25 emerge on the opposite side of the plurality of substrates, the stop bars 25 are deployed in a position substantially perpendicular to the slide bolt 21. FIG. 5 shows the fastening device with the stop bars 25 deployed.

Once the stop bars 25 are deployed, the shoulder bolt 10 is rotated causing the slide bolt 21 to move inwardly into the shaft 11 of the shoulder bolt 10, compressing the substrates between the stop bars 25 and a flange 13 on the shoulder bolt 10. The shoulder bolt 10 is rotated until a desired torque is reached.

Figure 1:
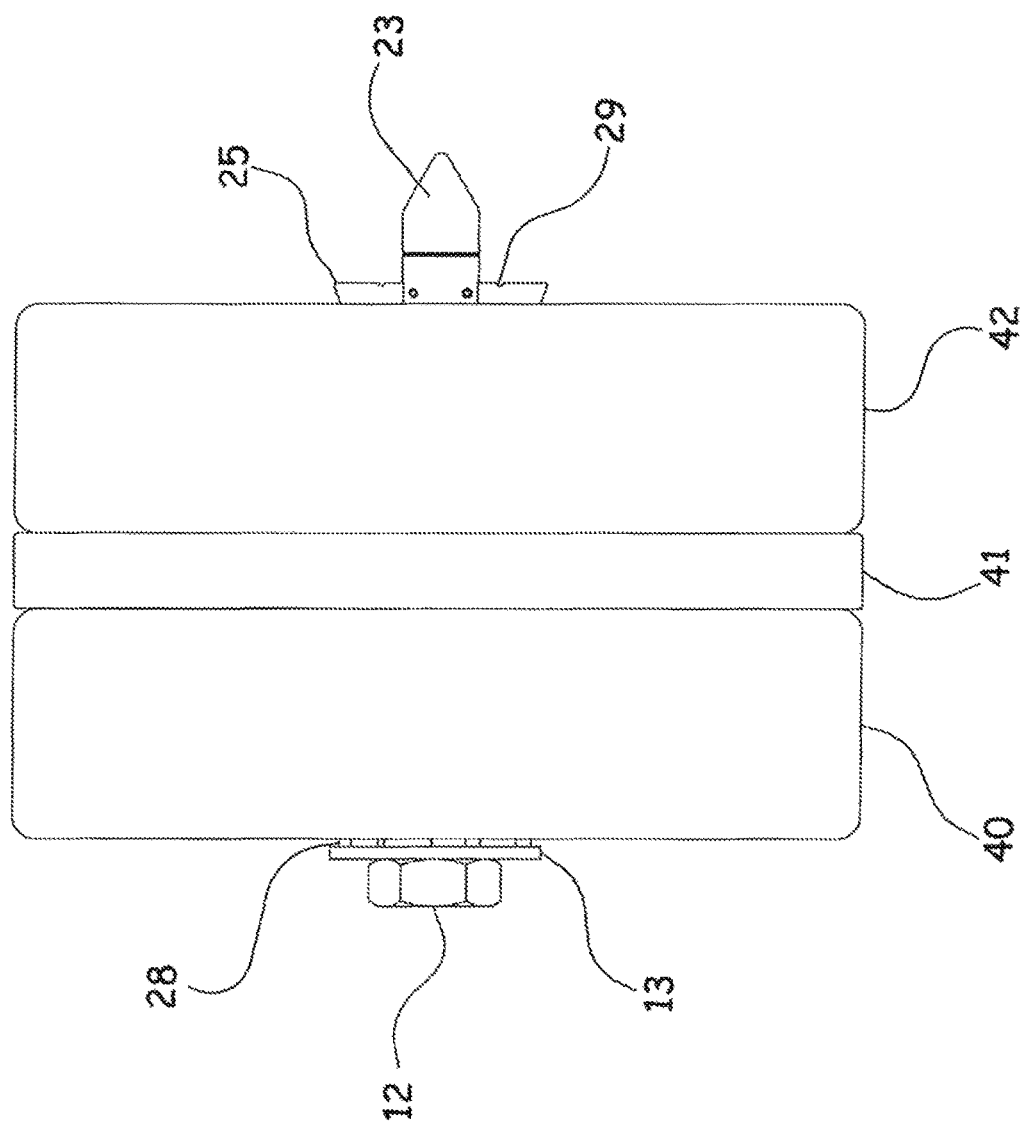
FIG. 1 is a perspective of the fastening device in its insertion position and fastening three substrates.
Figure 4:
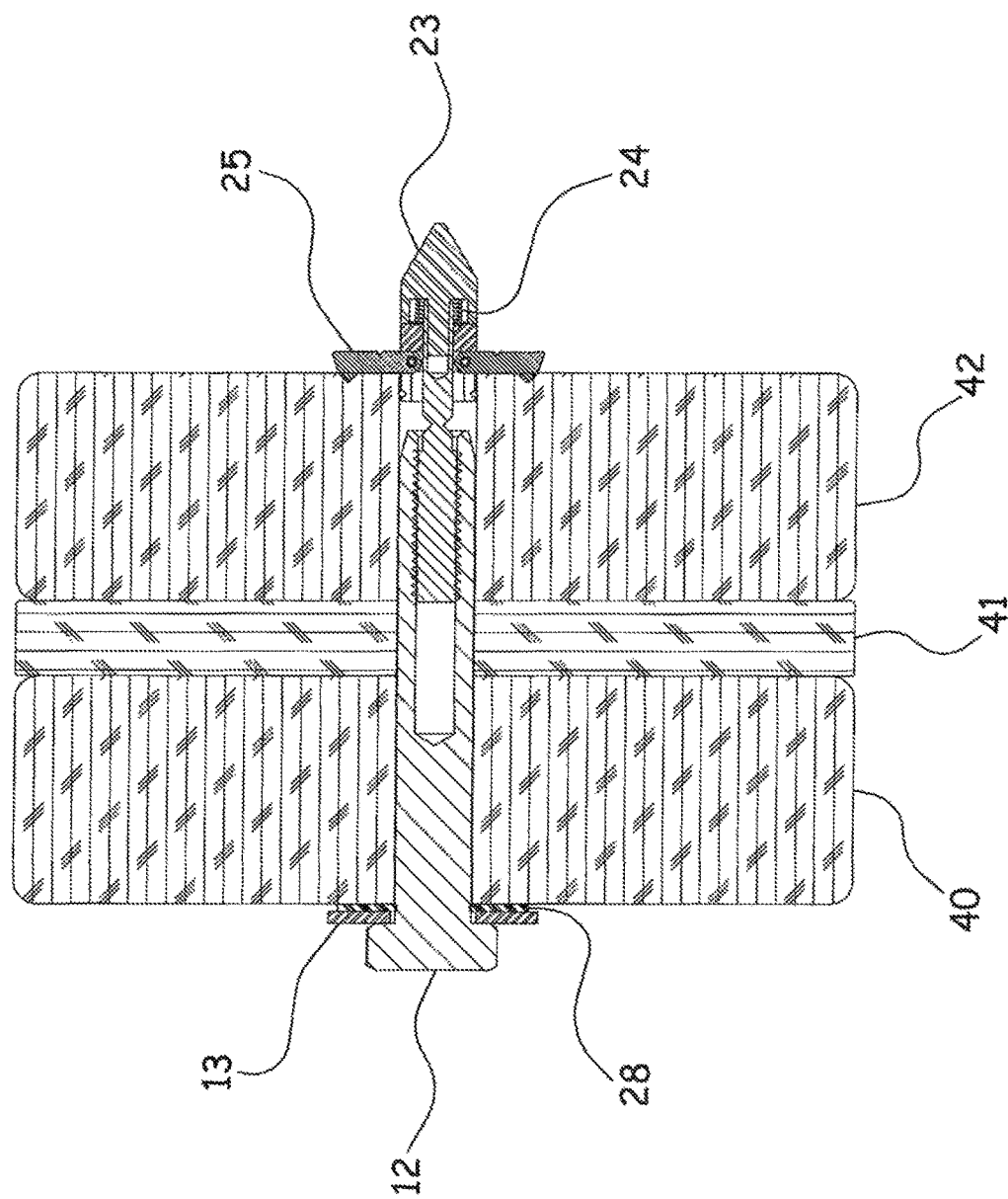
FIG. 4 is a cross-section of the fastening device fastening three substrates.

FIG. 1 shows the fastening device fastening a first substrate 40, a second substrate 41 and third substrate 42. The retaining ring 28 can be seen between the head 12 and the first substrate 40. The cap 23, the slide collar 22 and the stop bars 25 can be seen emerging from the third substrate. The operation of the fastening device is more clearly depicted in FIG. 4. The retaining ring 28 can be seen between the head 12 and the first substrate 40. As the shoulder bolt 10 is rotated the internally threaded shaft 11 works with the threaded first end of the slide bolt 21 to draw the slide bolt directionally towards the head 12, compressing the spring 24 between the cap 23 and the slide collar 22 and compressing the substrates between the head 12 and the stop bars 25.

Additional Embodiments

FIGS. 6-11 illustrate another embodiment of a fastening device or fastener 100. The fastener 100 can be used to couple with a substrate 150. The substrate 150 can include one or more substrate layers 151, 152. The substrate layers can have widths W1, W2. An aperture 153 can extend through the substrate 150 from a front side or face 154 to a rear side or face 155. In some implementations, the aperture 153 can be pre-drilled to allow the fastener 100 to pass through the substrate 150. The substrate 150 can comprise any material or combination of materials, including building and construction materials such as wooden framing elements, concrete and/or gypsum board or paneling.

The fastener 100 can include a bolt 110. The bolt 110 can be a conventional bolt such as found in hardware stores and other distributors. The bolt 110 can have a head 112 and a shaft 111. The shaft 111 can be threaded. The threading and diameter of the shaft 111 can be of any suitable sizing (e.g., conventional sizing such as ⅜"-16, #10-24, etc.). The head 112 can be attached to the shaft 111. The head 112 can have a drive portion shaped to engage with an assembly tool, such as a wrench, socket or screwdriver driver. For example, the head 112 can be externally hexagonal, square or include an internal tool cavity, such as slotted, cruciform, single or multiple square, torx, star or hexagonal. The head 112 can optionally include a flange or be used in combination with a washer, such as a flat washer.

The fastener 100 can further include a biasing element 120 configured to move the fastener 100 relative to the substrate 150. The biasing element 120 can be or include any suitable compressible media, such as any type of spring or resilient element. The biasing element 120 can be a permanent or a sacrificial element of the fastener 100. For example, the biasing element 120 could be or include a polymer element, such as a soft durometer urethane. The biasing element 120 could be configured for removal (e.g., torn away) at any suitable time, such as after the initial installation of the fastener 100. For example, the biasing element 120 could be removed once the fastener 100 is sufficiently secured that it is unlikely to rotate in response to rotation of the bolt 110. References to a conical spring 120 herein are for convenience in describing the illustrated embodiment, but can also refer to any other suitable type of biasing element.

In the illustrated arrangement, the biasing element is a cone-shaped compression spring or a conical spring 120. The conical spring 120 can be mounted on the shaft 111 of the bolt 110. The conical spring 120 can comprise a narrow end 121 and a wide end 122. Between the narrow end 121 and the wide end 122, the overall shape of the conical spring 120 can be generally tapered to form a cone shape or similar shape. The conical spring 120 can be formed of a length of wire 123. The wire 123 can be coiled to form the tapered shape of the spring 120. The conical spring 120 can have an uncompressed length and can be compressible to compressed length. The conical spring 120 can exert a force that is varies with and/or is proportional to the compression of the spring along its length (e.g., axially between the narrow and tapered ends 121, 122). The spring rate of the conical spring 120 can be linear or non-linear.

In some implementations, the conical spring 120 can be compressed substantially or fully into a flattened state. In such a state the coils of the tapered spring of the wire 123 can be nested within each other between the wide end 122 and the narrow end 121 such that the overall spring length is compressed to be substantially the diameter of the wire 123. In some implementations, the spring 120 can exert its maximum force in the flattened configuration. When assembled over the shaft 111, the narrow end 121 of the spring 120 can be adjacent to the head 112. In some implementations, a diameter of the narrow end 121 can be less than the diameter of the head 112 (or a flange thereof). However, in other arrangements, the wide end 122 can be positioned adjacent the head 112. In such arrangements, the head 112 can have a sufficiently large diameter or cross-sectional dimension to provide a base for the wide end 122 of the conical spring 120 or a washer (e.g., washer 133) could be employed, among other possible arrangements.

The fastener 100 can further include a slide body 130. In some implementations, the slide body 130 can be generally cylindrical in shape. The slide body 130 can comprise a first end 131 and a second end 132. The slide body 130 can be configured to be received within and/or extend through the aperture 153 of the substrate 150. The slide body 130 can have a diameter. In some implementations, the diameter can be between approximately 0.125" and 1.0". In other implementations, the diameter can be larger or smaller than the range provided here and/or include portions with larger or smaller diameters. A diameter of the aperture 153 can be slightly larger than the diameter of the slide body 130 (e.g., greater than or approximately 0.001 and 0.010 inches larger in some implementations).

The first end 131 of the slide body 130 can include an opening or cavity for receiving the shaft 111 of the bolt 110. An internal surface of the opening can include threads to threadingly engage with threads of the shaft 111. A washer 133 can be disposed over the shaft 111 and contact the conical spring 120. The conical spring 120 can press the washer 133 into contact with the first end 131. The first end 131 can be generally flat and/or perpendicularly oriented with respect to a longitudinal axis of the slide body 130.

The second end of 132 of the slide body 130 can comprise or support a toggle 140. The toggle 140 can comprise a stop link or stop bar. The toggle 140 can be used engage the fastener 100 with the rear face 155 of the substrate 150. The toggle 140 can include a first end 141 and a second end 142. The toggle 140 can be coupled with the second end 132 by a pin or pivot 143. The toggle 140 can be sized and shaped, or otherwise configured, to pass through the aperture 153 in a first configuration and to engage the rear face 155 in a second configuration to thereby prevent passage through the aperture 153. The toggle 140 can have a diameter or cross-sectional size that is the same as, or substantially the same as, the slide body 130.

In the first configuration, the toggle 140 can pass through the aperture 153. For example, the second end 132 of the slide body 130 can be shaped to be semi-cylindrical in cross-section and the second end 142 of the toggle 140 can be shaped in a complementary manner (e.g., semi-cylindrical in cross-section) to together form a circular cross-section. The first configuration can be formed where the toggle 140 is oriented about the pivot 143 to be axially aligned with slide body 130 to form an outer diameter that fits within the aperture 153. In other implementations, the toggle 140 can be otherwise compressed in the first configuration (e.g., the toggle 140 can be spring-loaded). In some implementations, the toggle 140 is manually positioned in the first configuration (e.g., by a user). In some implementations, the insertion of the slide body 130 and toggle 140 into the aperture 153 will compress the toggle 140 into the first configuration.

In the second configuration, the toggle 140 can be sized, shaped, oriented or otherwise configured to prevent passage through the aperture 153. For example, the toggle 140 can have a length TL that is greater than the diameter of the aperture 153. When inserted through the aperture 153 in the first configuration, the toggle 140 can switch into the second configuration. The length TL of the toggle 140 in the second configuration (e.g., perpendicular to the aperture 153) can prevent the toggle 140 and the slide body 130 from being removed from the aperture 153 (i.e., in the direction of the front face 154).

Figure 8:
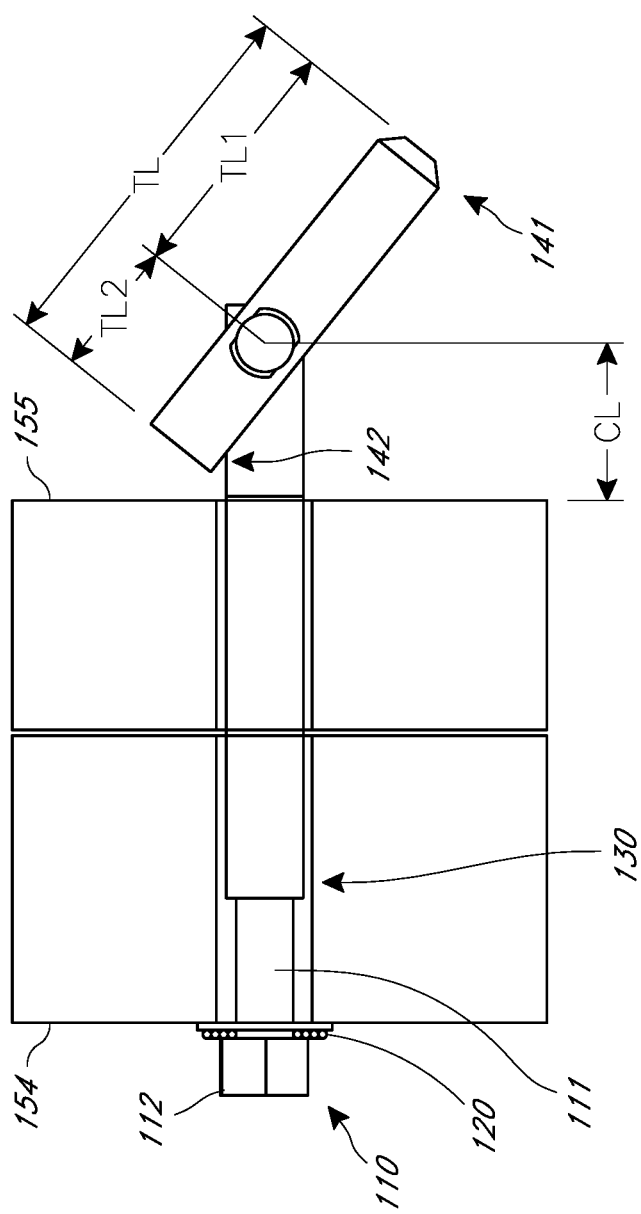
FIG. 8 shows the fastener of FIG. 6 advanced within the aperture.

The toggle 140 can be switched from the first configuration to the second configuration by the force of gravity. For example, the toggle 140 can be eccentrically coupled with the pivot 143 such that the toggle 140 is biased to rotate about the pivot 143 under the force of gravity. As shown in FIG. 8, the first end 141 can have a first length TL1 and the second end 142 can have a second length TL2. The first length TL1 can be greater than the second length TL2 or otherwise configured to be actuated by gravity. For example, the lengths TL1 and TL2 can be configured relative to the overall length TL, shape or center of gravity of the toggle 140 such that the toggle 140 tends to rotate to the second orientation—or out of axial alignment with the slide body— in response to gravity and without any external force sufficient to overcome the gravitational force. In some implementations, the pivot 143 can include a spring (e.g., a torsional spring) to bias the toggle 140 towards or into the second configuration.

Figure 7:
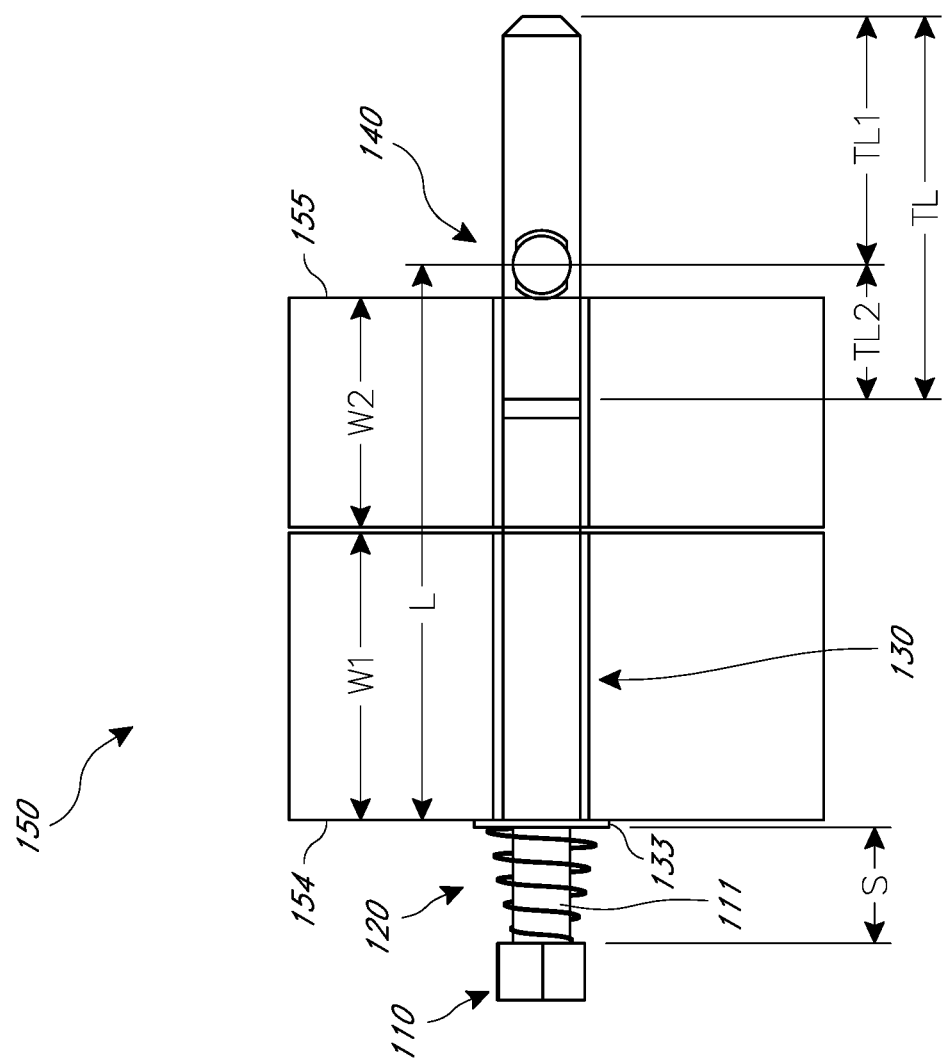
FIG. 7 shows the fastener of FIG. 6 within an aperture of a substrate.

In use, the fastener 100 can be assembled with the substrate 150. This can, for example, couple together the layers 151, 152. The spring 120 and the washer 133 can be assembled over the shaft 111 of the bolt 110 and the bolt 110 can be assembled (e.g., threadingly engaged) with the slide body 130. The toggle 140 can be switched (e.g., manually or by interference with the aperture 153) into the first configuration and the fastener 100 can be inserted into the substrate 150. The toggle 140 and/or the second end 132 of the slide body 130 can be inserted into the aperture 153 from the front face 154, as shown in FIG. 7. The slide body 130 can be advanced within the aperture 153.

The fastener 100 can be advanced within the aperture 153 until the wide end 122 of the conical spring 120 engages with the front face 151. The wide end 122 can press against the surface of the front face 152 (e.g., through the optional washer 133). The narrow end 121 can engage the head 112. The spring 120 can define a compression length S, the total distance the spring 120 can be compressed. In some implementations, the conical spring 120 can be compressed more than a conventional non-tapered spring having a similar total length because of the conical shape factor of the conical spring 120.

Figure 9:
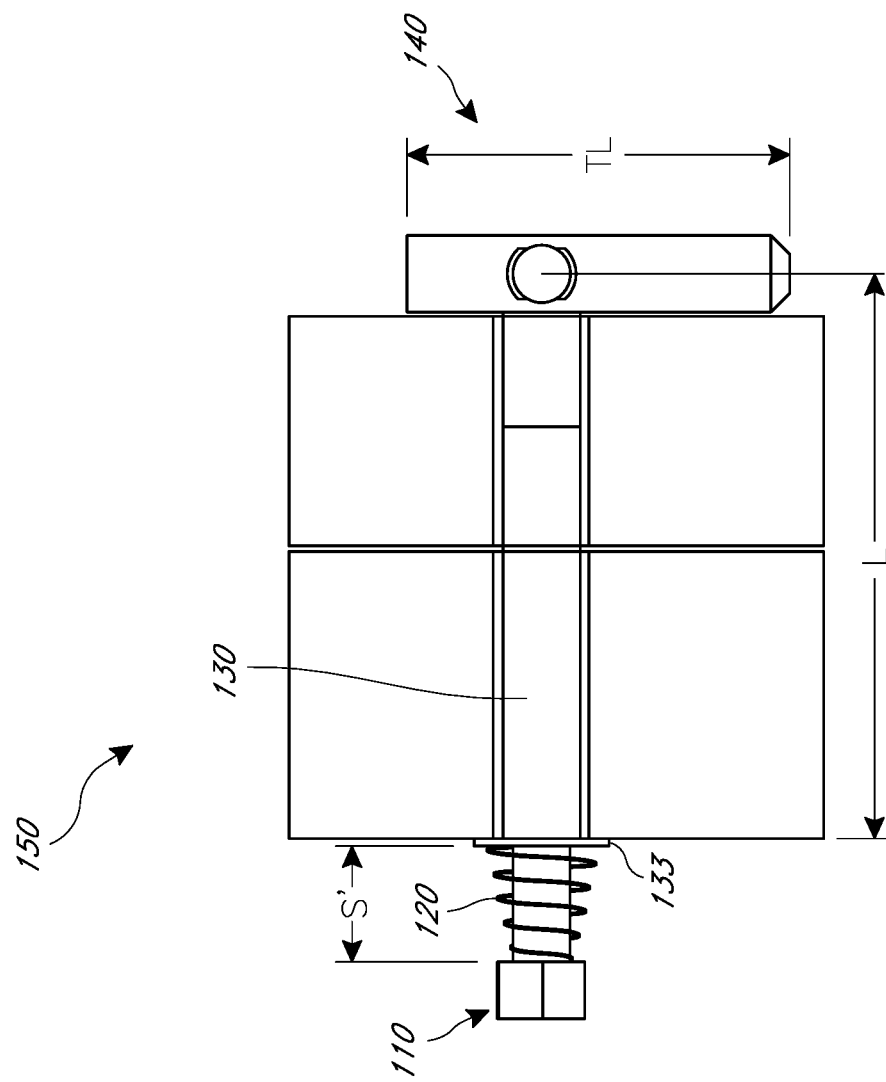
FIG. 9 shows a toggle of the fastener of FIG. 6 engaged with a back face of the substrate.

A lateral force (e.g., from a user) on the head 112 can compress the spring 120 (reduce the compression length S). The compression of the spring (either fully or partially) can advance the toggle 140 out of the aperture 153 on the rear side 155. In some implementations, the compression length S can be selected such that the pivot 143 can be advanced a clearance length CL out of the aperture 153. In some implementations, the clearance length CL can be equal to or greater than the second length TL2. In some cases, it may be necessary or desirable for the clearance length CL to be greater than the second length TL2 such that an entirety of the second end 142 can clear the rear side 155 of the substrate when moving through an arcuate path of motion. Thus, the compression length S of the spring 120 may be substantially equal to or greater than the second length TL2 or the clearance length CL. The compression length S can be selected with consideration of the second length TL2 and shape of the toggle 140 to be sufficient to permit actuation or movement of the toggle 140 from the first configuration to the second configuration. Although the shape of the toggle 140 can influence the exact requirement for the compression length S, it is expected that the compression length S will be approximately equal to or greater than the second length TL2. The toggle 140 can then move towards the second configuration, as shown in-transition in FIG. 8. A release of the force on the head 112 can allow the spring 120 to extend (either partially of fully). The extension of the spring 120 can pull the toggle 140 into engagement with the rear side 155 of the substrate 150, as shown in FIG. 9.

Figure 10:
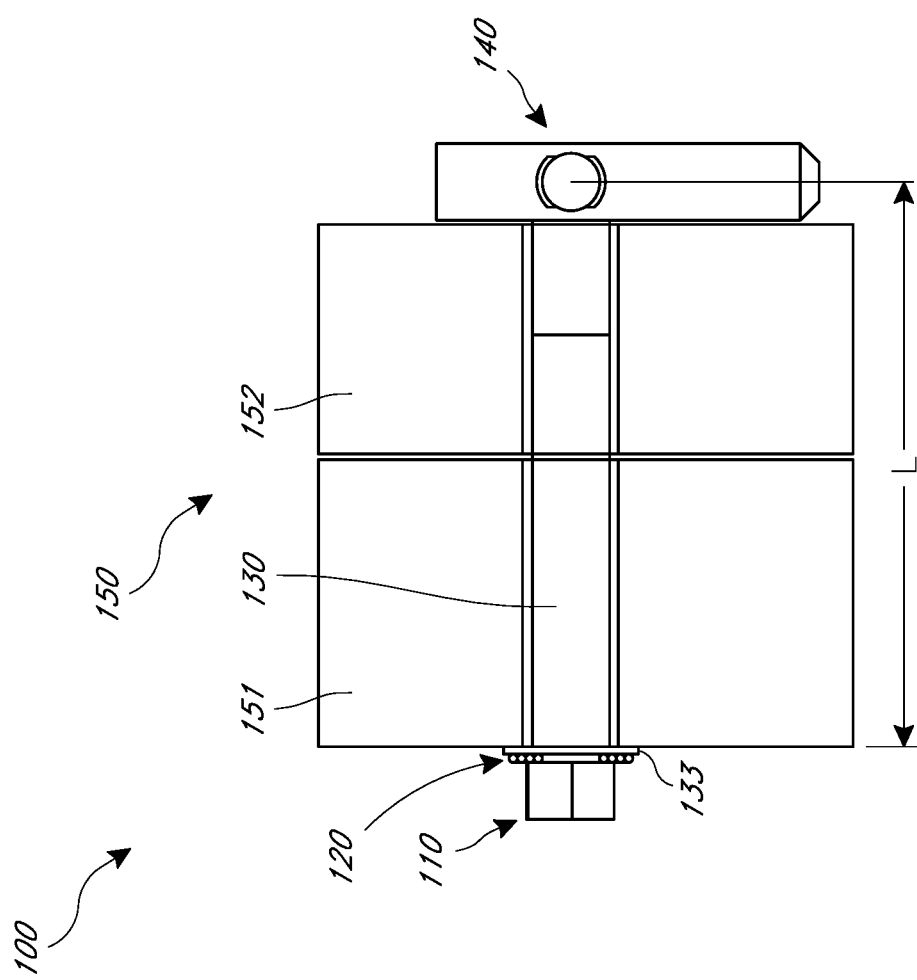
FIG. 10 shows the fastener of FIG. 6 in a fully tightened configuration.
Figure 11:
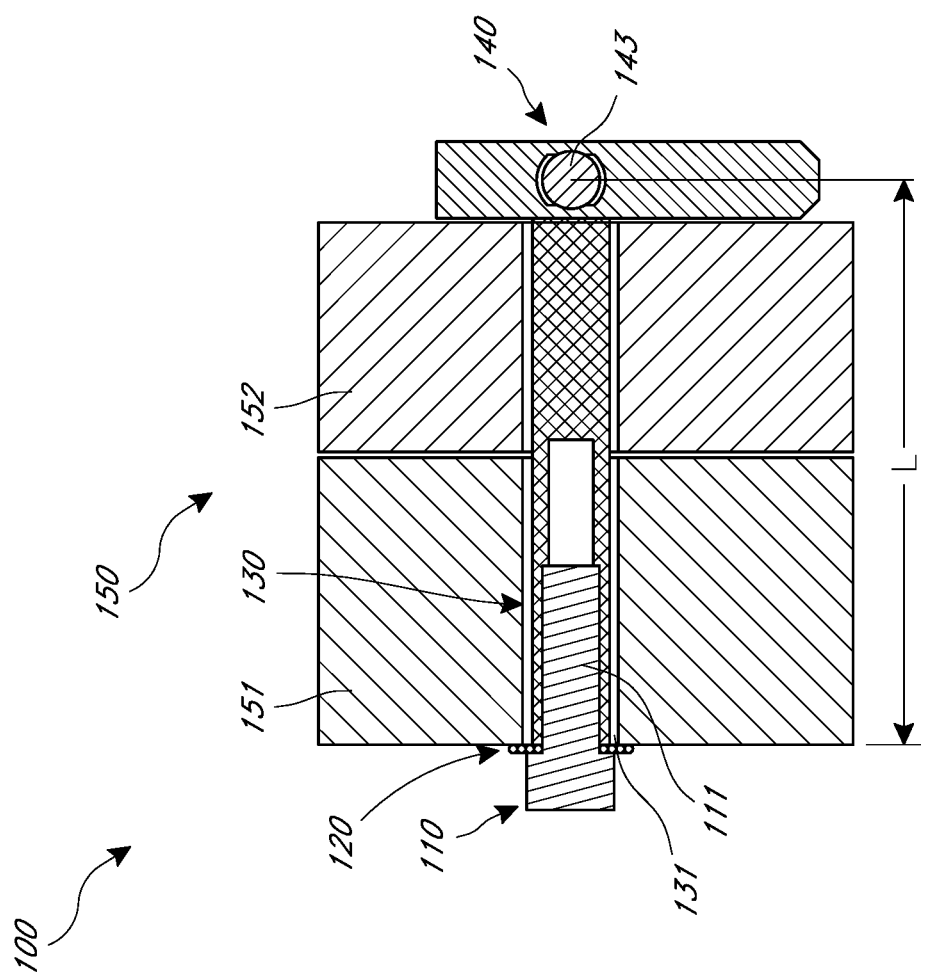
FIG. 11 shows a sectional view of the fastener of FIG. 6 in the fully tightened configuration.

The compression and/or extension of the spring 120 to automatically engage the toggle 140 with the rear side 155 facilitates the installation of the fastener 100 within the substrate 150. The engagement of the toggle 140 with the rear side 155 can enable or facilitate turning of the bolt 110 to tighten the fastener 100 (e.g., by advancing the bolt 110 further within the slide body 130). The engagement of the toggle 140 with the rear side 155 can prevent the slide body 130 from turning with the bolt 110 during tightening of the fastener 100. In some configurations, the force produced by the spring 120 is sufficient to allow the bolt 110 to be tightened without the application of an extraneous force on the slide body 130, which may be difficult to apply. Thus, the spring 120 may hold the toggle 140 against the rear side 155 of the substrate 150 with sufficient force such that friction between the toggle 140 and the rear side 155 (along with any resistance to rotation of the slide body 130 due to engagement with the substrate 155 within the aperture 153) inhibits or prevents rotation of the slide body 130 within the aperture 153. The bolt 110 can thus be tightened as desired by the user to couple the layers 151, 152, as shown in FIG. 10. In some implementations, the bolt 110 is tightened and the conical spring 120 is collapsed. In some implementations, the spring 120 can be fully collapsed to the flattened state (e.g., leaving a thickness only of the wire 123) to enable a firm engagement of the head 112 with the washer 133 and/or the front face 154. The washer 133 can act as a bearing surface for the spring 120 to engage with the front face 154.

The fastener 100 can include a length L. The length L can extend from the first end 131 of the slide body 130 to the pivot 143. The user can select the fastener 100 and/or the configuration of the fastener 100 based on the selection of length L. Thus length L can be based on any of various factors. For example, the length L can be selected by a user based the width of the substrate 150, the compression of the spring 120, the total length of the toggle 140 L and/or the first or second link lengths TL1, TL2. In one implementation, the length L is equal to widths W1 and W2 of the layers 151, 152, plus the clearance length CL (or the second link length TL2), minus a fractional portion (fraction) of one of the widths W1 or W2. In some implementations, the fraction can be between ⅛ and ⅞. In one implementation, the fraction is ¼. For example, the substrate 150 can include a two-by-four board and a four-by-four (2"×4" and 4"×4" or sanded equivalents). The clearance length CL of the toggle 140 can be 1.0". Following the above formulae using a fraction of ¼ of the four-by-four, the length L for the fastener 100 is 6".

The compression length S of the spring 120 preferably is greater than or equal to the clearance length CL. This ensures that the spring 120 can extend far enough at the front side 154 to engage the toggle 140 with the rear side 155 and/or ensures that the spring 120 continues to apply a force to engage the toggle 140 with the rear side 155 (e.g., during tightening) without user intervention between the insertion and tightening steps. The clearance length CL for the purposes of comparison with the compression length S can be adjusted based on the shape and profile of the toggle 140. For example, as shown the clearance length CL can be subtracted by half the diameter of the toggle 140. Other formulae for appropriate lengths of the fastener components also exist and would be within the ordinary skill in view of the description herein.

Figure 12:
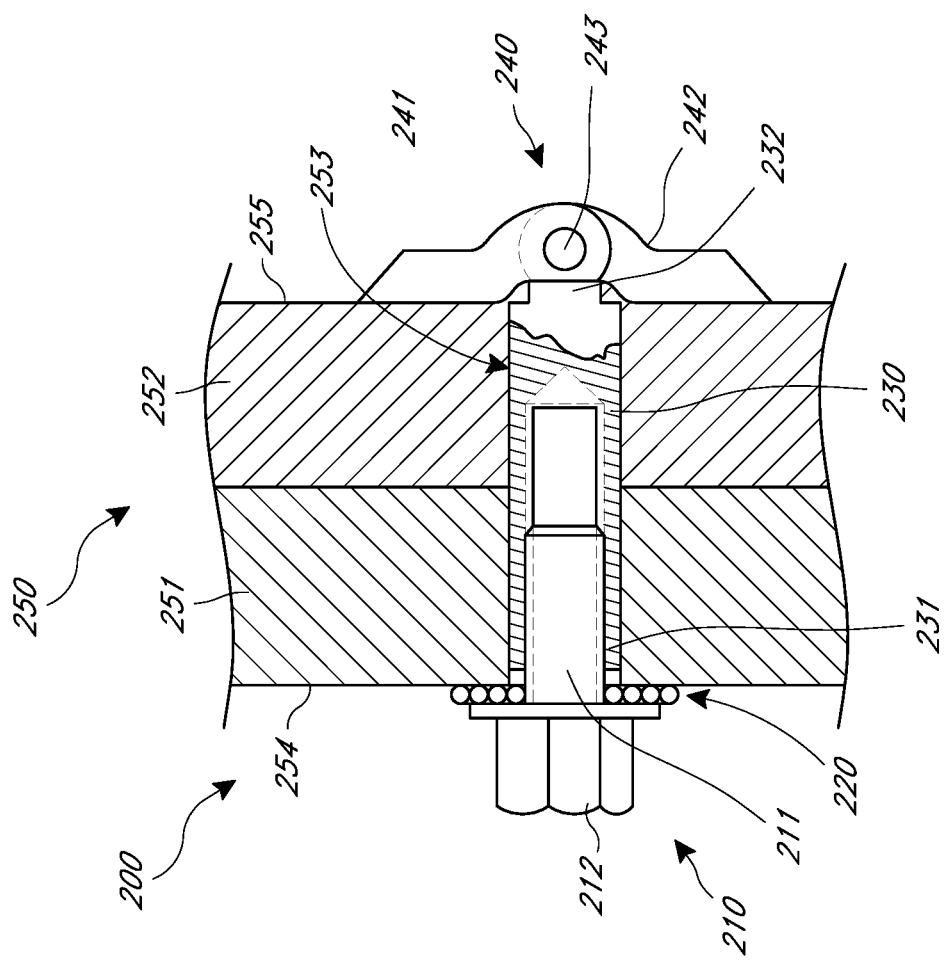
FIG. 12 shows yet another embodiment of a fastener.

FIG. 12 illustrates another fastener embodiment, fastener 200. The fastener 200 can be structured with similar components and used similarly to the fastener 100, as described above. The fastener 200 can include a bolt 210, a biasing element (e.g., a conical spring 220), a slide body 230 and a toggle 240. The toggle 240 can include first and second stop bars 241, 242. The first and second stop bars 241, 242 can be pivotably engaged with a pivot 243. The pivot 243 can be engaged with a second end 232 of the slide body 230. A torsional spring can bias the stop bars 241, 242, into a second configuration (e.g., an open position). The second configuration can engage with a back face 255 of a substrate 250. The stop bars 241, 242 can be rotated together into a first configuration (e.g., a compressed position). The first configuration can have a diameter that's smaller than an aperture 253 through the substrate 250.

The fastener 200 can be advanced through the substrate 250 to couple together substrate layers thereof. The toggle 240 can be advanced into the aperture 253 in the first configuration. The spring 220 can engage with a front face 254 of the substrate 250. Pressure on the bolt 210 can compress the spring 220 and advance the toggle 240 out of the aperture 253. The toggle 240 can switch into the second configuration (e.g., by expansion of the torsional spring). Thus, a compression length S of the spring 220 preferably is substantially equal to or greater than a length TL of one or both of the stop bars 241, 242 so that the spring 220 can extend far enough at the front face 254 to engage the toggle 240 with the back face 255. The compression length S can be selected with consideration of the length TL and shape of the stop bars 241, 242 to be sufficient to permit actuation or movement of the toggle 240 from the first configuration to the second configuration. Although the shape of the stop bars 241, 242 can influence the exact requirements, it is expected that the compression length S will be approximately equal to or greater than the length TL.

The first and second stop bars 241, 242 can be open in the second configuration and prevent removal of the slide body 230 from the aperture 253 by engagement with the back face 255. The first and second stop bars 241, 242 can be prevented from expansion away from the slide body 230 by mechanical interference between the stop bars between each other and/or between the second end 232 or the pivot 243 or other means thereby. The spring 220 can extend to automatically engage the stop bars 241, 242 with the back face 255. The bolt 210 can be tightened by turning with respect to the slide body 230. The slide body 230 can be held substantially in place by the spring 220 and the toggle 240. The user can thus tighten the fastener 200. Tightening of the bolt 210 can include compression of the conical spring 220 to a flattened or substantially flattened state.

The present examples are to be considered illustrative and not restrictive, and the invention is not to be limited to the detail given herein, but may be modified within the scope of the appended claims.

What is claimed is:

1. An assembly of an anchoring fastener attaching together layers of a building construction substrate in which only a front side of the substrate is accessible, comprising:
    a slide body received within an aperture through the layers of the substrate, the slide body having a first end and a second end, the first end having a threaded opening;
    a bolt that engages the slide body, the bolt comprising a head and a threaded shaft, the threaded shaft engaged with the threaded opening of the slide body;
    a toggle that prevents removal of the fastener from the aperture, the toggle comprising a single stop bar having a linear surface extending from a first end to a second end of the stop bar, the stop bar pivotably engaged with the second end of the slide body by a pivot, the toggle having a first configuration in which the toggle can advance with within the aperture and a second configuration which prevents the fastener from being retracted from the aperture;
    a conical spring, the conical spring having a narrow end and a wide end, the conical spring disposed over the threaded shaft of the bolt with the narrow end of the conical spring adjacent to the head of the bolt and the wide end of the conical spring adjacent to the first end of the slide body;
    wherein the anchoring fastener has an installed position in which the conical spring is fully compressed between the head of the bolt and a front face of the substrate and the linear surface of the stop bar is engaged with a back face of the substrate;
    wherein the anchoring fastener is configured to be converted from an uninstalled position to the installed position by inserting the slide body into the aperture from the front face of the substrate with the toggle in the first configuration and advancing the slide body within the aperture until the wide end of the conical spring engages with the front face of the substrate;
    wherein compression of the conical spring is configured to further advance the slide body within the aperture and advance the toggle a clearance length out of the aperture on the back face of the substrate such that the toggle moves to the second configuration;
    wherein extension of the conical spring is configured to retract the slide body within the aperture and wherein a force of the conical spring engages the linear surface of the toggle with the back face of the substrate such that contact between the flat surface of the toggle and the back face inhibits rotation of the slide body relative to the substrate in response to rotation of the bolt and wherein the stop bar prevents retraction of the slide body through the aperture;
    wherein the bolt is configured to be tightened to compress the conical spring and to engage with the front face through the conical spring when the anchoring fastener is in the installed position.

2. The fastener of claim 1, wherein the slide body is cylindrical and has an outer diameter between 0.125" and 1.0" and the toggle in the first configuration has an outer diameter that is smaller than or equal to a diameter of the aperture of the substrate and a diameter that is larger than the diameter of the aperture in the second configuration.

3. The fastener of claim 1, wherein the toggle is eccentrically mounted with respect to the pivot such that the force of gravity can rotate the single stop bar about the pivot into the second configuration.

4. The fastener of claim 1, wherein the conical spring is compressible into a flattened state.

5. The fastener of claim 1, further comprising a washer, the washer disposed between the wide end of the conical spring and the slide body, the washer providing a bearing surface for the conical spring to act against the front face of the substrate.

6. The fastener of claim 1, wherein a compressive length of the conical spring is the same as or greater than the clearance length of the toggle from the aperture.

7. The fastener of claim 1, wherein a length of the fastener from the first end of the slide body to the pivot of the toggle is equal to the sum of a width of each of the layers of the substrate, plus the clearance length of the toggle, minus a fraction of the width of one of the plurality of substrates, the fraction being between selected from between ⅛ and ⅞.

8. An assembly of an anchoring fastener attaching together layers of a building construction substrate through an aperture in which only a front side of the substrate is accessible, comprising:
    a slide body having a first end and a second end, the first end having a threaded opening;
    a bolt having a head and a threaded shaft;
    a toggle comprising a single stop bar having a linear surface extending from a first end to a second end of the stop bar, the stop bar pivotably engaged with the second end of the slide body by a pivot, the toggle having a first configuration in which the stop bar defines a first diameter relative to a longitudinal axis of the slide body and a second configuration in which the toggle defines a second diameter relative to the longitudinal axis of the slide body;
    a conical spring disposed on the threaded shaft between the slide body and the head;
    wherein the toggle in the first configuration and the slide body are configured to be inserted within the aperture from a front face of the substrate and compression of the conical spring against the front face is configured to advance the toggle a clearance length out of the aperture on a back face of the substrate such that the toggle moves to the second configuration;
    wherein extension of the conical spring is configured to automatically engage the linear surface of the toggle with the back face of the substrate and wherein contact between the linear surface with the back face of the substrate inhibits rotation of the slide body in response to tightening of the bolt, and wherein the fastener is configured for the bolt to be tightened to compress the conical spring between the head and the front face;

wherein the anchoring fastener has an installed position in which the conical spring is fully compressed between the head of the bolt and the front face of the substrate and the linear surface of the stop bar is engaged with the back face of the substrate.

9. The fastener of claim 8, wherein the toggle is eccentrically mounted with respect to the pivot such that the force of gravity can rotate the single stop bar about the pivot into the second configuration.

10. The fastener of claim 8, wherein the conical spring is compressible into a flattened state.

11. The fastener of claim 8, further comprising a washer disposed between a wide end of the conical spring and the slide body, the washer providing a bearing surface for the conical spring to act against the front face of the substrate.

12. The fastener of claim 8, wherein a compressive length of the conical spring is the same as or greater than the clearance length of the toggle from the aperture.

* * * * *